(12) United States Patent
Bensend

(10) Patent No.: US 12,403,675 B2
(45) Date of Patent: Sep. 2, 2025

(54) PRE-STRESSED PLATE OR SHELL STRUCTURES

(71) Applicant: Enclos Corporation, Eagan, MN (US)

(72) Inventor: Austin Bensend, Woodbury, MN (US)

(73) Assignee: Enclos Corporation, Eagan, MN (US)

( * ) Notice: Subject to any disclaimer, the term of this patent is extended or adjusted under 35 U.S.C. 154(b) by 1054 days.

(21) Appl. No.: 17/143,828

(22) Filed: Jan. 7, 2021

(65) Prior Publication Data

US 2021/0129498 A1 May 6, 2021

Related U.S. Application Data

(63) Continuation of application No. 15/409,690, filed on Jan. 19, 2017, now Pat. No. 10,913,243.

(Continued)

(51) Int. Cl.
*B32B 17/10* (2006.01)
*B32B 3/08* (2006.01)
(Continued)

(52) U.S. Cl.
CPC .......... *B32B 17/10091* (2013.01); *B32B 3/08* (2013.01); *B32B 13/04* (2013.01); *B32B 15/00* (2013.01); *B32B 17/00* (2013.01); *B32B 17/10036* (2013.01); *B32B 17/10807* (2013.01); *B32B 17/1088* (2013.01); *B32B 17/10899* (2013.01); *B32B 21/042* (2013.01); *B32B 21/13* (2013.01); *B32B 27/08* (2013.01); *B32B 27/30* (2013.01); *B32B 27/42* (2013.01); *E04B 1/35* (2013.01); *B32B 2250/02* (2013.01); *B32B 2250/24* (2013.01); *B32B 2307/102* (2013.01); *B32B 2307/412* (2013.01);
(Continued)

(58) Field of Classification Search
CPC ....... C03C 21/002; C03B 27/02; C03B 27/00; Y10T 29/49629; Y10T 29/49632
See application file for complete search history.

(56) References Cited

U.S. PATENT DOCUMENTS

| 3,090,162 A | 5/1963 | Baroni |
| 3,599,381 A | 8/1971 | Gartner |

(Continued)

FOREIGN PATENT DOCUMENTS

| CN | 201027354 Y | 2/2008 |
| CN | 201486001 U | 5/2010 |

(Continued)

OTHER PUBLICATIONS

English Machine Translation of CN-203654547-U (Year: 2014).*

(Continued)

*Primary Examiner* — Sarang Afzali
(74) *Attorney, Agent, or Firm* — Dorsey & Whitney LLP

(57) ABSTRACT

A pre-stressed structure and a method for forming a pre-stressed structure are provided. The pre-stressed structure comprises a panel including a first region pre-stressed into a condition of membrane tension, resulting in the panel having increased transverse stiffness. The pre-stressed structure may further comprise a second region pre-stressed into a condition of membrane compression. The panel may be a plate or a shell and may form part of an insulating glass unit, which in turn may form part of a curtainwall unit.

16 Claims, 8 Drawing Sheets

Related U.S. Application Data

(60) Provisional application No. 62/280,483, filed on Jan. 19, 2016.

(51) Int. Cl.
  *B32B 13/04* (2006.01)
  *B32B 15/00* (2006.01)
  *B32B 17/00* (2006.01)
  *B32B 21/04* (2006.01)
  *B32B 21/13* (2006.01)
  *B32B 27/08* (2006.01)
  *B32B 27/30* (2006.01)
  *B32B 27/42* (2006.01)
  *E04B 1/35* (2006.01)
  *C03B 23/023* (2006.01)
  *C03B 27/04* (2006.01)

(52) U.S. Cl.
  CPC ....... *B32B 2307/50* (2013.01); *B32B 2307/51* (2013.01); *B32B 2307/54* (2013.01); *B32B 2307/542* (2013.01); *B32B 2307/544* (2013.01); *B32B 2307/546* (2013.01); *B32B 2307/552* (2013.01); *B32B 2307/732* (2013.01); *B32B 2419/00* (2013.01); *B32B 2590/00* (2013.01); *B32B 2605/00* (2013.01); *B32B 2607/00* (2013.01); *C03B 23/023* (2013.01); *C03B 27/04* (2013.01); *C03B 27/0413* (2013.01); *Y10T 29/49629* (2015.01)

(56) References Cited

U.S. PATENT DOCUMENTS

| | | | |
|---|---|---|---|
| 3,793,127 A * | 2/1974 | Wartenberg | C03C 21/001 |
| | | | 428/220 |
| 3,909,226 A | 9/1975 | McCourty et al. | |
| 3,984,252 A | 10/1976 | Kiefer | |
| 4,853,018 A * | 8/1989 | Koss | C03B 23/0352 |
| | | | 65/273 |
| 8,615,938 B2 | 12/2013 | Arbour | |
| 10,913,243 B2 | 2/2021 | Bensend | |
| 2005/0217319 A1* | 10/2005 | Yoshizawa | E06B 3/67339 |
| | | | 65/34 |
| 2007/0175583 A1* | 8/2007 | Mosallam | B29C 70/088 |
| | | | 428/411.1 |
| 2015/0274585 A1* | 10/2015 | Rogers | C03C 21/002 |
| | | | 65/30.14 |
| 2016/0354996 A1* | 12/2016 | Alder | C03C 3/091 |

FOREIGN PATENT DOCUMENTS

| | | | |
|---|---|---|---|
| CN | 101560802 B | | 4/2012 |
| CN | 202430871 U | | 9/2012 |
| CN | 202519827 U | | 11/2012 |
| CN | 203654547 U | * | 6/2014 |
| CN | 104831940 A | | 8/2015 |
| CN | 204676906 U | | 9/2015 |
| CN | 103912086 B | | 12/2015 |
| EP | 1254866 A1 | | 11/2002 |
| EP | 1420124 B1 | | 3/2007 |
| NL | 2002047 C | | 4/2010 |

OTHER PUBLICATIONS

Merriam Webster definition of Centroid; https://www.merriam-webster.com/dictionary/centroid (Year: 2019).

* cited by examiner

PRE-STRESSED PLATE OR SHELL STRUCTURES

CROSS-REFERENCE TO RELATED APPLICATION

This application is a continuation of U.S. patent application Ser. No. 15/409,690, filed Jan. 19, 2017, now U.S. Pat. No. 10,913,243, which claims the benefit under 35 U.S.C. 119(e) to U.S. Provisional Patent Application No. 62/280,483, filed Jan. 19, 2016, and entitled "PRE-STRESSED STRUCTURE", each of which is hereby incorporated by reference herein in the entirety and for all purposes.

FIELD

The present disclosure relates to a pre-stressed structure. More specifically, the present disclosure relates to a structure including one or more pre-stressed panels, such as plates (e.g., planar or 2-dimensional structures) or shells (e.g., 3-dimensional structures).

BACKGROUND

A curtainwall unit is an external, generally non-load-bearing wall that is connected to a building structure, usually from floor to floor. Each curtainwall unit typically includes a frame and one or more infill panels positioned within the frame. The infill panels may be formed of glass, metal, wood, plastic, or various other types of materials.

The panels of a curtainwall unit generally are designed to accommodate loads, such as transverse loads or pressure from wind, for example. To increase the transverse-load stiffness of the panels, typically the thickness of panels is increased, the number of panels layered together that share load is increased, the overall size or clear span of the panels (especially in the short dimension of the panels) is reduced, and/or stiffeners or other backing members are affixed to the panels. These approaches allow the panels to remain generally planar, but increase the thickness and weight of the infill panel, thereby increasing the space and weight requirements for transportation and storage and rendering the curtainwall unit more difficult to handle and install due to its increased size and weight, for example.

It would be desirable to provide a panel with increased stiffness to transverse load or pressure compared to conventional techniques, without increasing the thickness or weight of the panel. In addition to easier handling at the building site due to the decreased weight of the panel, the decreased thickness of the panel would reduce the space needs for transportation and storage and would allow the conservation of materials, thus saving costs and protecting the environment.

A curtainwall unit is described in the Background for informational purposes only, and is not intended to limit the panel described herein to a particular application or industry. The panel has broad application across a variety of industries, as further explained hereafter.

BRIEF SUMMARY

A pre-stressed plate or shell structure and one or more methods of forming a pre-stressed plate or shell structure are provided. The pre-stressed structure may have reduced thickness and/or weight, a reduced number of or no stiffeners, an increased size or span, and/or better performance at higher transverse load conditions compared to conventional structures. The pre-stressed structure may use less material and/or be less expensive than conventional structures. The pre-stressed structure may exhibit modified acoustic transmission or attenuation, resist buckling, resist fatigue, and/or provide natural frequency modification or tuning.

In some embodiments, a pre-stressed structure comprises a first panel. The first panel comprises a first region pre-stressed into a condition of membrane tension, resulting in the panel having increased transverse stiffness. The first panel may further comprise a second region pre-stressed into a condition of membrane compression. The second region may surround the first region.

In some embodiments, a method of forming a pre-stressed structure comprises generating, in a first panel, a first pre-stress condition of membrane tension in a first region of the first panel, and maintaining the first panel in the first pre-stressed condition. The method may further comprise generating, in the first panel, a second pre-stress condition of membrane compression in a second region of the first panel, and maintaining the first panel in the second pre-stressed condition. The second region may surround the first region.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION

Figure 1:
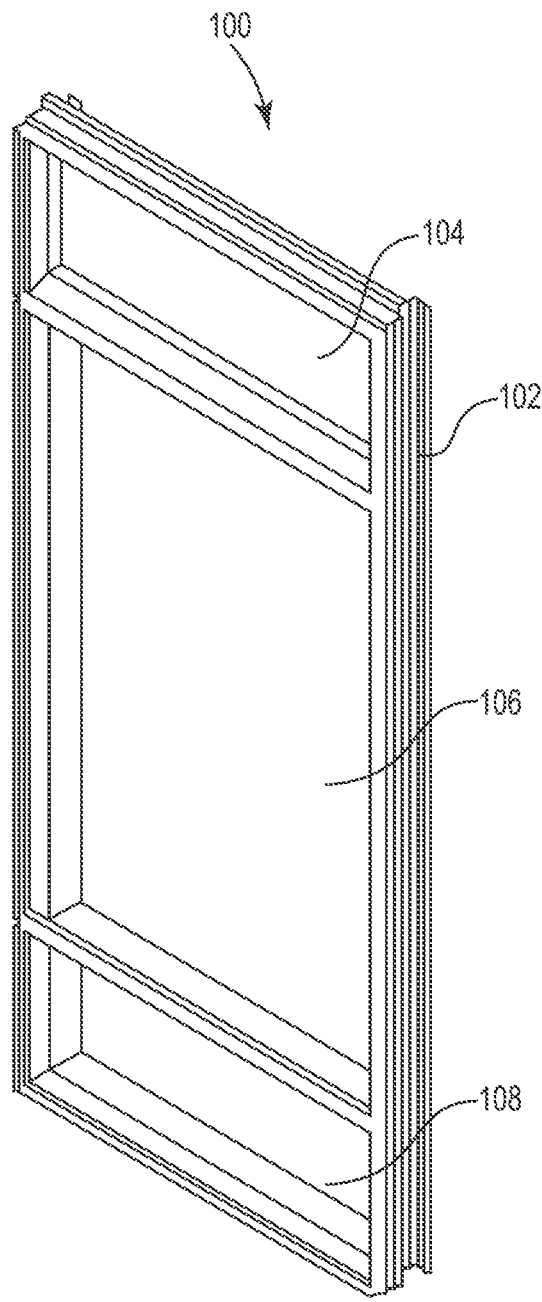
FIG. 1 illustrates a curtainwall unit in accordance with an embodiment of the invention.

The present disclosure provides an approach to create a panel, for example a plate or shell, of higher relative stiffness to transverse load compared to current practice. The approach is applicable, for example, to plates or shells (2-dimensional or 3-dimensional bodies, respectively) supported or stiffened near their perimeter or regions where membrane compression are generated and that resist transverse load according to large deflection theory. For example, the approach is applicable for plates and shells that support load in a manner consistent with large deformation plate theory, where the relationship between magnitude of transverse load and deflection is not linear. The method is suitable for glass, and for other applications as well.

The approach may include elastically deforming a panel (e.g., a relatively thin material, such as a plate or a shell) from a first shape to a second shape to generate a pre-stressed condition in the panel that reduces the deflection and/or increases the stiffness of the panel. For example, the panel may be pre-stressed by forcing the panel out of a non-planar shape (e.g., a hyperbolic paraboloid shape) and into a flatter shape (e.g., a planar shape), which flattening generates tensions and compressions in the membrane of the panel. The panel may be supported at its perimeter by a support structure (e.g., a frame), and the supporting structure may hold the panel in the second shape, such that the membrane compression is carried within the panel itself, rather than being carried by the support structure. The membrane compression may exist at the perimeter of the panel, where the panel is not able to buckle because of the supporting structure, and the membrane tension may arise away from the perimeter of the panel and may stiffen the panel. The membrane stress pattern is further described below.

The approach has broad application across a variety of industries. For example, creases are commonly applied to large faces of rectangular HVAC ductwork to increase the stiffness to transverse load. The creases are used to reduce the deformation in the pressurized ducts and noise caused by the movement. Ducts fashioned from metal that has been stretched into a twisted form (helicoid or hyperbolic paraboloid) according to the present disclosure may not require these creases to be applied to the ducts. Likewise, in the transportation industry, panels pre-stressed according to the present disclosure may prove useful as a means to reduce stiffeners and weight, including on the roofs and wall panels of dry van trailers. The approach may have applications in aerospace and naval architecture to, for example, relocate regions where buckling is a concern by shifting locations where tension and compression are carried within a member, or to reduce the range of stress cycles to possibly limit the fatigue experienced by a panel. The approach may also have application to the shipping and packaging industry, especially where the stiffness of large sheets of packaging material is of concern, including large rectangular boxes and bulk packaging.

Referring to FIG. 1, a curtainwall unit 100 is provided. The curtainwall unit 100 may include a frame 102 and one or more panels. In FIG. 1, the curtainwall unit 100 includes three panels 104, 106, 108, although the curtainwall unit 100 may include more or less than three panels. Each panel 104, 106, 108 of FIG. 1 may include a subframe extending along its periphery, and the subframe may be received by the frame 102. The panels 104, 106, 108 may include multiple layers. For example, in some implementations, the panels may include two layers, with one layer facing towards an interior of a building and the other layer facing towards an exterior of the building. The panels 104, 106, 108 may be sealed to their respective subframes, for example, using an adhesive, tape, wet sealant, dry gasket, or other suitable sealant, and the subframes may be secured to the frame 102, for example, with fasteners. The panels 104, 106, 108 may be formed of glass, metal, concrete, wood, plastic, or other types of material. The material may be annealed, heat strengthened, fully tempered, chemically tempered, laminated, or treated in other ways.

Figure 2A:
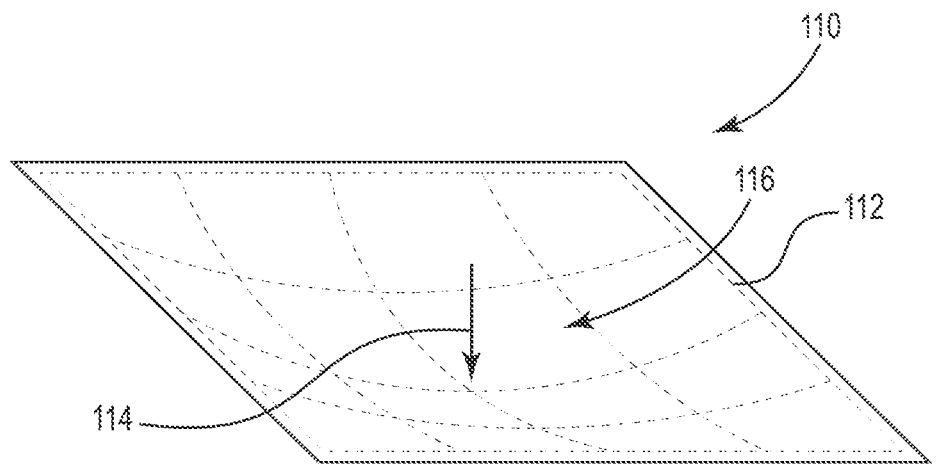
FIGS. 2A and 2B illustrate relative stiffness of a panel resisting transverse load in accordance with an embodiment of the invention.
Figure 2B:
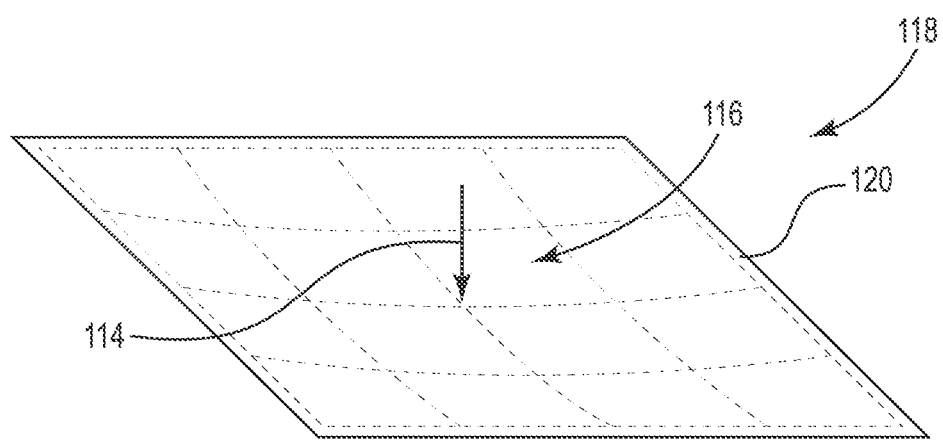

FIGS. 2A and 2B illustrate relative stiffness of a panel resisting transverse load in accordance with an embodiment of the invention. The panel may be formed, for example, as a plate (e.g., a 2-dimensional body), a shell (e.g., a 3-dimensional body), or other structure that, for example, supports load in a manner consistent with large deformation plate theory, where the relationship between the magnitude of transverse load and deflection is not linear. Referring to FIG. 2A, a panel 110 is supported or stiffened near its perimeter 112 and a transverse load 114 is applied to a middle region 116 of the panel 110. The panel 110 has a relatively large deflection at the middle region 116 of the panel 110 because of the transverse load 114. Referring to FIG. 2B, a pre-stressed panel 118 is supported or stiffened near its perimeter 120 and the transverse load 114 is applied to a middle region 116 of the panel 118. The pre-stressed panel 118 has the same thickness and outer dimensions as the panel 110, but the pre-stressed panel 118 deflects less than the panel 110 in the middle region 116 of the panel 118, because the pre-stressed panel 118 has a higher stiffness to transverse load or pressure then the panel 110. The terminology "load" is used hereafter for the sake of simplicity without intent to limit.

Figure 3A:
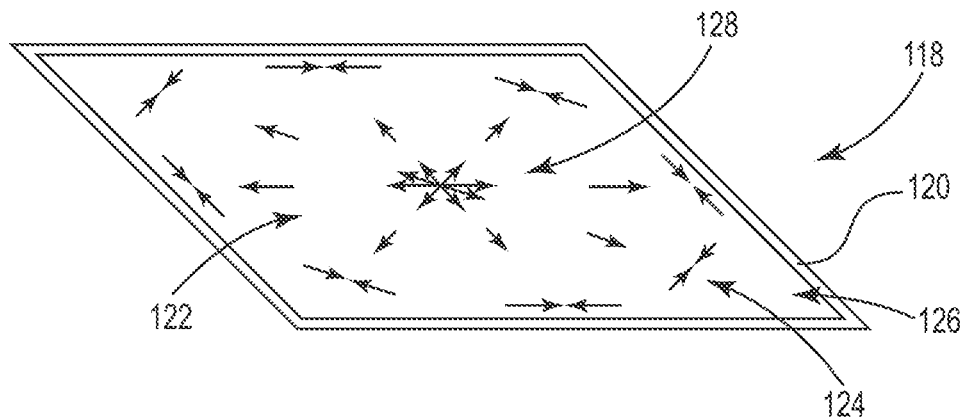
FIGS. 3A and 3B illustrate membrane or in-plane pre-stresses in a panel prior to application of a transverse load in a middle region of the panel in accordance with an embodiment of the invention.
Figure 3B:
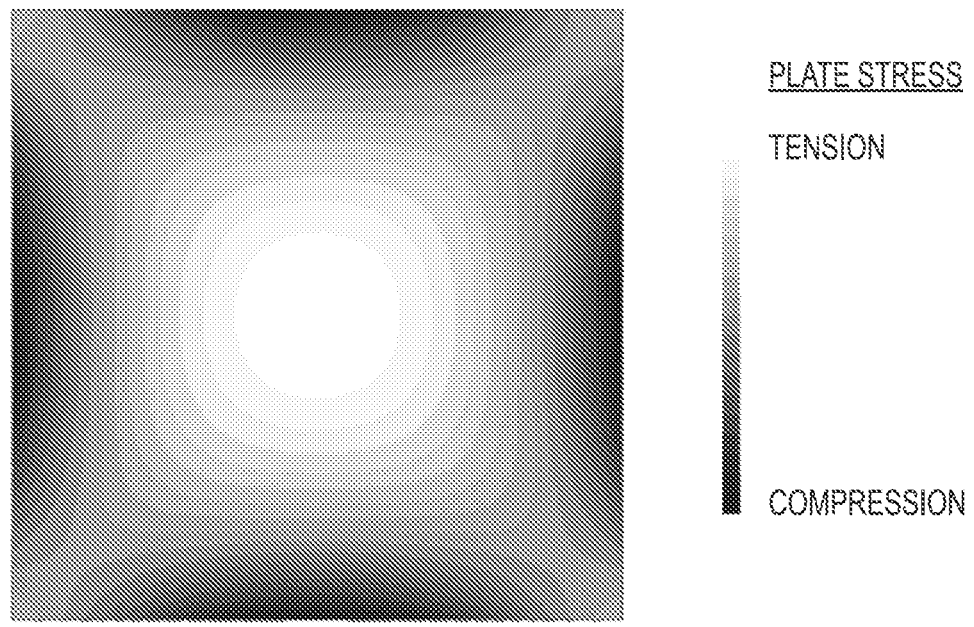

FIGS. 3A and 3B illustrate membrane or in-plane pre-stresses in panel 118 prior to application of a transverse load in accordance with an embodiment of the invention. The terminology "membrane" is used hereafter for the sake of simplicity without intent to limit. By creating a pre-stress membrane condition within the panel 118 as seen in FIGS. 3A and 3B, the stiffness of the panel 118 is increased and the panel 118 itself resists the membrane component of the transverse load 114.

As illustrated in FIGS. 3A and 3B, the panel 118 may have a pre-stress condition of membrane compression 124 at a region 126 near the perimeter 120 of the panel 118 and a condition of membrane tension 128 in the middle region 122 of the panel 118 prior to a transverse load, such as transverse load 114, being applied to the middle region 122 of the panel 118. The condition of membrane tension 128 in the middle region 122 of the panel 118 increases the transverse stiffness of the panel 118, resulting in less deflection for a given transverse load. The increased transverse stiffness of the panel 118 changes the natural frequency of the panel 118. As shown in FIGS. 3A and 3B, the region 126 may continuously or discontinuously extend around the entire perimeter of the panel 118 and may partially or entirely surround the middle region 122.

Figure 4:
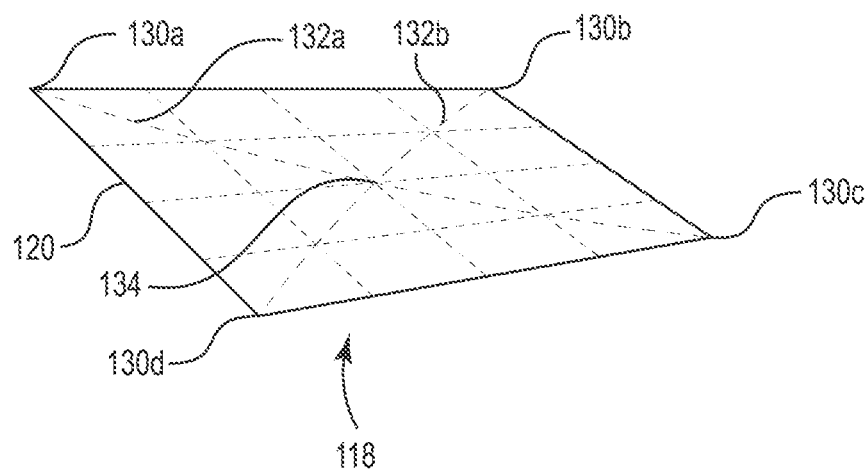
FIG. 4 illustrates a panel formed initially into a hyperbolic paraboloid shape in accordance with an embodiment of the invention.

To generate the pre-stress condition of FIGS. 3A and 3B, the panel 118 may be initially formed in a non-planar shape. As illustrated in FIG. 4, one approach to generate the pre-stress condition of FIG. 3 in the panel 118 is to form the panel 118 in an initial shape that is non-planar, such as one that lies on a hyperbolic paraboloid, or other suitable shape. In other embodiments, the initial shape may be planar and stresses may be built in to the panel 118. It is to be understood that "stress" may refer to one or more of tension, torsion, compression, shear, other forces, or combinations of these. In FIG. 4, the panel 118 is illustrated as a rectangular panel with four corners 130a, 130b, 130c, 130d formed along the perimeter 120 of the panel 118, and the panel 118 has a saddle shape with principle curvatures 132a, 132b of opposite sign. A positive principle curvature 132a extends from one corner 130a to an opposite corner 130c, and a negative principle curvature 132b extends from one corner 130b to an opposite corner 130d and crosses the positive principle curvature 132a at a saddle point 134 located in the middle region 122 of the panel 118. The corners 130a, 130c may be located in a first plane that is offset from the saddle point 134 in a first direction, and the corners 130b, 130d may be located in a second plane that is offset from the saddle point 134 in a second direction opposite the first direction.

The panel 118 may be formed into shapes other than the hyperbolic paraboloid illustrated in FIG. 4. For example, other surface geometries may be suitable for pre-stressing the panel 118 as illustrated in FIGS. 3A and 3B, including helicoid or any other shape, regular or irregular. For instance, the panel 118 may be initially formed into a helicoid. One equation that can be used to define a hyperbolic paraboloid shape is $$z = \frac{x \cdot y}{c}$$

in a Cartesian coordinate system, where x, y, and z are the coordinates of the shape, and c is a constant to calibrate the extent that the panel is non-planar. The more general equation $$z = \frac{x^2}{a^2} - \frac{y^2}{b^2}$$

is also a valid descriptor of the shape, where a and b are parameters that influence the curvature. In either case, the saddle point may be located near the center of the panel to be pre-stressed. Other geometries may also exhibit similar benefit when elastically deformed in this manner. In general, elastically deforming the panel 118 (for example, a plate or shell) at the supports is used to generate a state of pre-stress in the panel 118 that may have useful properties. For example, tension regions may be generated by this approach if the stiffness is to be increased within those regions. Buckling in the resulting compression regions may be resisted by the support constraints. Other approaches also exist to generate a pattern of pre-stress as described later.

The initial shape of the panel 118 may be formed by various approaches. For example, the initial shape of the panel 118 may be formed by additive manufacturing, rolling (hot or cold), stretching, hot forming (slumping), edge tensioning to a perimeter frame, or other manufacturing approaches. In the case of generating tempered glass, bending and tempering lines may be set up with rollers following the generating lines of the hyperbolic paraboloid shape. The outline shape of the panel 118 may be square, rectangular, circular, triangular, trapezoidal, or other suitable shapes.

Figure 5:
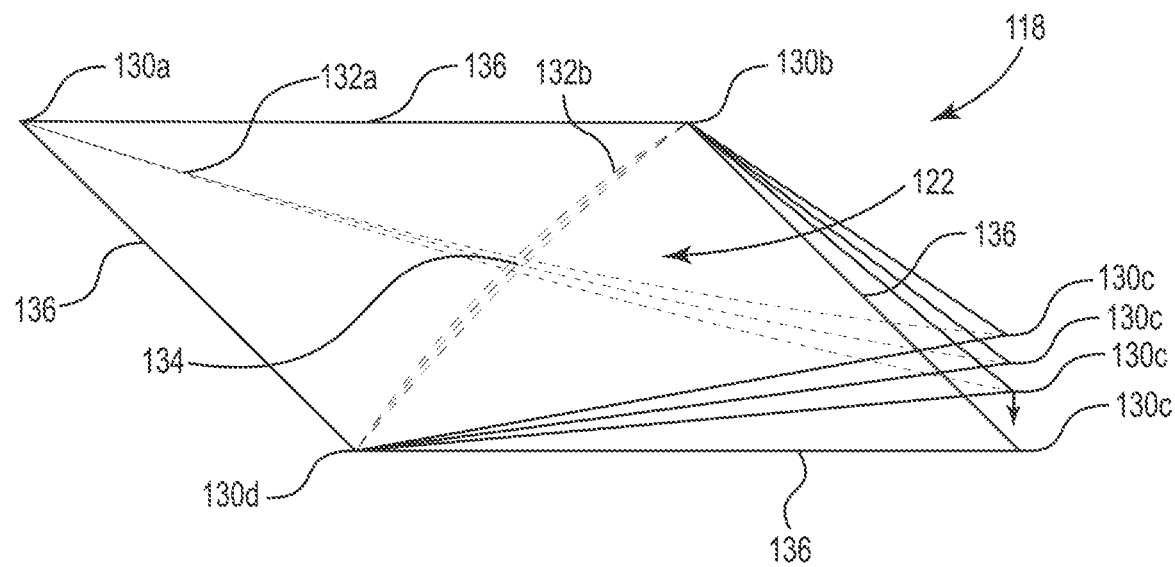
FIG. 5 illustrates the panel of FIG. 4 being elastically deformed toward a planar shape in accordance with an embodiment of the invention.

By pre-stressing the panel 118, the stiffness of the panel 118 may be tunable for transverse load. FIG. 5 illustrates the panel 118 of FIG. 4 being elastically deformed toward a planar shape in accordance with an embodiment of the invention. The stiffness of the panel 118 resisting transverse load is increased when the panel 118 is elastically deformed to a flat condition by forcing all of the edges 136 of the panel 118 to be co-planar (see FIG. 5), because this results in a pre-tensioned state in the middle region 122 of the panel 118 (see FIG. 3). The same stiffening effect is also observed when deforming the panel 118 to be a flatter version of a hyperbolic paraboloid (stiffness results shown in FIG. 12). In other words, to stiffen the panel 118 to transverse loads, the final geometry of the panel 118 may be elastically deformed to be flatter than its initial geometry, regardless of whether the final geometry is planar or non-planar. To reduce the stiffness of the panel 118, the panel 118 may be deformed in the other direction, or modified in any other way to generate a state of membrane compression near the center of the panel, rather than membrane tension.

Figure 6A:
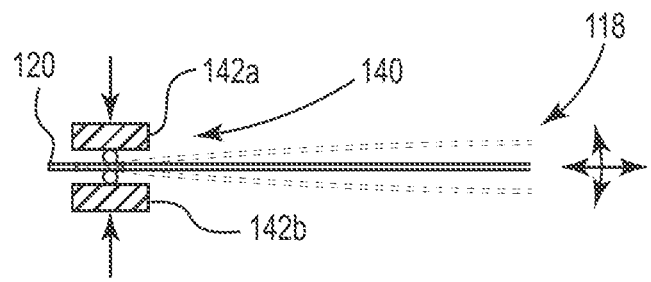
FIG. 6A illustrates a perimeter support condition of a panel in accordance with an embodiment of the invention.
Figure 6B:
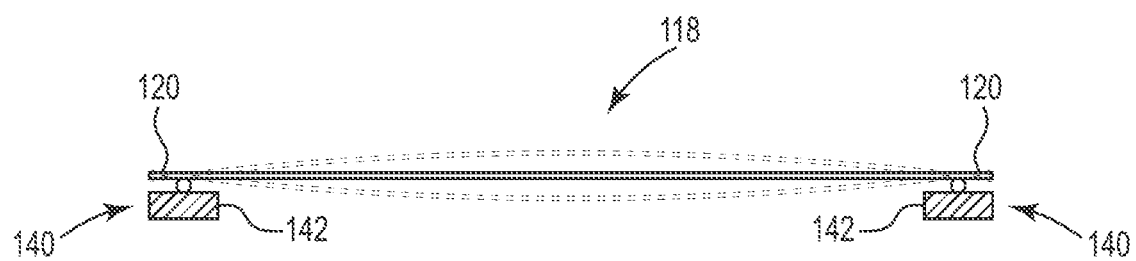
FIG. 6B illustrates another perimeter support condition of a panel in accordance with an embodiment of the invention.

FIGS. 6A and 6B illustrate perimeter support conditions of a panel in accordance with an embodiment of the invention. As illustrated in FIGS. 6A and 6B, the panel 118 is supported along its perimeter 120 by a subframe or support structure 140. The terminology "support structure" is used hereafter for the sake of simplicity without intent to limit. The support structure 140 may provide support and holding forces normal (i.e., perpendicular) to a face of the panel 118. The support structure 140 may be sufficiently stiff to hold the panel 118 in a geometry (see FIG. 5) that is flatter than the initial geometry (see FIG. 4) of the panel 118. It is not necessary, although it may be beneficial, for the support structure 140 to resist membrane stresses, bending moments, shear forces, or any other forces besides normal to the panel surface locally. The support structure 140 may allow rotation of the panel 118 about the support structure 140 and in-plane translation of the panel 118 as shown in FIGS. 6A and 6B. The support structure 140 may be integral to the panel 118 itself, such as in the case of returns formed on the edges of a panel, such as a metal panel. The support structure 140 may include one or more supports positioned on one or both sides of the panel 118 to resist load in both directions normal to the panel 118. As illustrated in FIG. 6A, the support structure 140 may include a first support 142a positioned on a first side of the panel 118 and a second support 142b positioned on a second side of the panel 118 opposite the first side. As illustrated in FIG. 6B, the support structure 140 may include one or more supports 142 positioned on the same side of the panel 118. The first and second supports 142a, 142b may extend lengthwise along the perimeter 120 of the panel 118.

Figure 7:
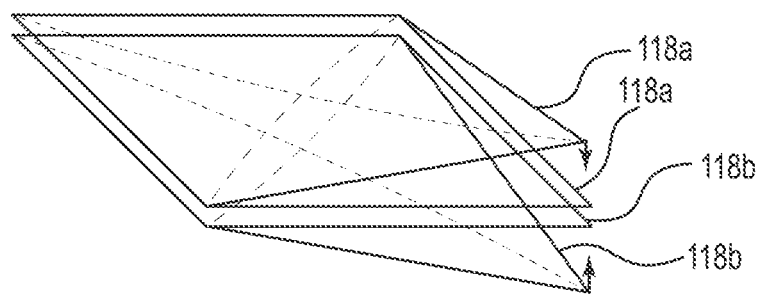
FIG. 7 illustrates multiple panels elastically deformed and attached together in a pre-stressed equilibrium state in accordance with an embodiment of the invention.

FIG. 7 illustrates multiple panels 118a, 118b that are elastically deformed and attached together, such as in a laminated glass configuration or such as in an insulating glass unit (IGU). The assembly may be in a pre-stressed equilibrium state in accordance with an embodiment of the invention. As illustrated in FIG. 7, a first panel 118a may be formed in a non-planar shape, such as a hyperbolic paraboloid, and elastically deformed into a flat condition in which its edges are co-planar with one another. A second panel 118b may be formed in a non-planar shape, such as a hyperbolic paraboloid that may be the same or different from other panels, and arranged such that its geometry mirrors the geometry of the first panel 118a. The second panel 118b may be elastically deformed into a flat condition in which its edges are co-planar with one another. By mirroring the hyperbolic paraboloid geometry of the panels 118a, 118b and attaching the opposing panels 118a, 118b together, the panels 118a, 118b hold themselves in a state of equilibrium, such that the resulting shape of the multiple layer build-up is flat (see FIG. 7) and each of the panels 118a, 118b is pre-tensioned in the middle of the panels to resist transverse loads (see FIGS. 3A and 3B). In an embodiment, the two panels are not in a planar state after being joined in an opposing manner, as the resulting IGU may require less deformation when glazed into a generally planar curtain wall unit when compared to an IGU made from a plurality of layers formed in the same direction. The panels 118a, 118b may form an IGU, which in turn may form part of a curtainwall unit, such as the curtainwall unit 100 illustrated in FIG. 1.

Figure 8:
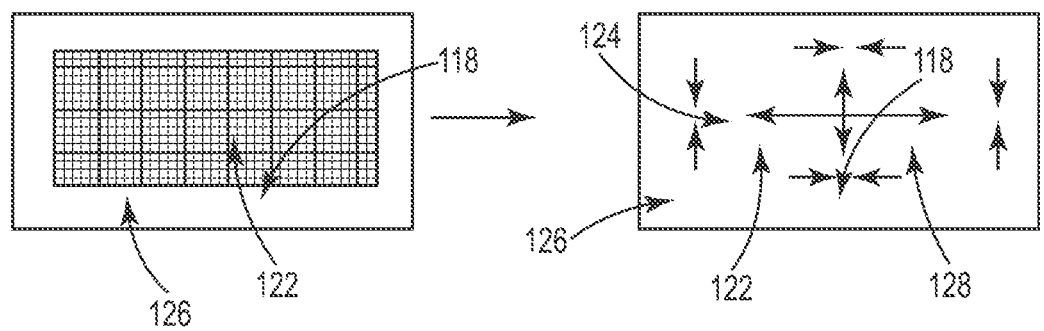
FIG. 8 illustrates membrane or in-plane pre-stresses in a panel prior to application of a transverse load in accordance with an embodiment of the invention.

Other suitable approaches for forming a pre-tension in a panel may be used. For example, heat may be applied to the panel in an uneven manner, such as by welding or tempering, to generate a similar pre-tension (see FIG. 8). Additionally or alternatively, differentially cooling the panel on a tempering line may pre-tension the panel to resist the membrane tension component of the transverse load (see FIG. 8). In FIG. 8, the middle region 122 of the panel 118 initially has a higher temperature than the perimeter region 126 of the panel 118. Then, the panel 118 is cooled to equilibrium (e.g., the panel has substantially the same temperature in the middle region 122 and the perimeter region 126) to create a pre-stress condition of membrane compression 124 in the perimeter region 126 of the panel 118 and a condition of membrane tension 128 in the middle region 122 of the panel 118. In some embodiments, two pieces of material (such as sheets), at different temperatures (e.g., one hot, one cold) may be affixed together, and when the temperatures equilibrate (for example, the hot piece of material cools), stresses may be generated in the pieces of material to provide uneven quenching or temperature changes and lock in the stresses. The effectiveness of these approaches may vary based on the degree of non-linearity between the load and deflection of the panel. These approaches may apply to tempering glass, fabricating metal, or other materials.

Experimental Data and Analysis

The following data was obtained primarily from non-linear finite element analysis and the methodology described in ASTM E1300. As described hereafter, the transverse stiffness goes up and deflection goes down when a shell of non-planar geometry is elastically forced flat at its supported edges.

A case study based on both finite element analysis and the approach given in ASTM E-1300 was conducted. The case study is based on a large residential high-rise building in New York City. The glass type on the high-rise building was a four-side supported insulating glass unit (IGU), with edge dimensions of approximately 136 inches by 136 inches. All thicknesses in the finite element models were consistent with those used in ASTM E1300. Transverse wind pressures up to 45 psf were considered in the analyses. The typical deflection limit specification for architectrual glass in the U.S. market is L/60 or 1 inch maximum, where L is the short dimension of the glass.

Figures 9A, 9B, 9C:
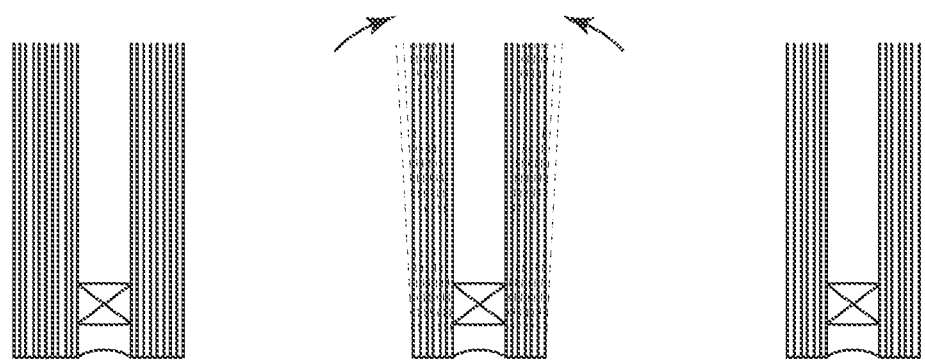
FIG. 9A illustrates a reference case (conventional glazing) with ⅝" heat strengthened (HS) laminated outboard with ½" HS monolithic inboard.
FIG. 9B illustrates a pre-stressed ⅜" fully tempered (FT) outboard with pre-stressed ⅜" FT inboard in accordance with an embodiment of the invention.
FIG. 9C illustrates a reference case (conventional glazing) with ⅜" FT outboard with ⅜" FT inboard.

The glazing used as a reference case (i.e., a conventional approach to meet the deflection limits) in the case study was the same as that used in the high-rise building: 5/16" heat strengthened glass laminated with 0.06" PVB interlayer to 5/16" heat strengthened glass on the outboard lite, with a ½" thick heat strengthened inboard lite, as seen in FIG. 9A. For short duration wind load, laminated glass has similar stiffness as monolithic glass of the same thickness. The result of the high-rise building glazing was a center of glass deflection of 1.13" at a 3-second gust of 45 psf for the laminated layup, based on analysis using ASTM E1300. For reference, center of glass deflection would have been 1.00" per ASTM E1300 if the outboard lite was a monolithic 5/8" rather than a laminated lite of the same thickness.

The pre-stressed panel solution was analyzed using finite element analysis software. In the finite element model, the pre-stressed panel exhibited lower relative deflection even with a thinner, pre-stressed IGU as seen in FIG. 9B. This would not have been the case if the glass was made conventionally. The makeup of the pre-stressed IGU was 3/8" fully tempered outboard lite with 3/8" fully tempered inboard lite. The pre-stressed IGU was comprised of two lites that were hot formed and tempered to a hyperbolic paraboloid shape that was then elastically forced into a plane by forcing edge supports to be co-planar. The initial shape of each layer was a section of hyperbolic paraboloid centered on the origin (x=0, y=0) with each corner of the hyperbolic paraboloid panel being 12" out of plane from the remaining three corners (the pre-stressed glass surface is described by equation $$z = \frac{x \cdot y}{1541.3}$$

prior to forcing it flat).

Because of the nature of the analysis, ASTM E1300 was not applicable for the pre-stressed glass analysis, so a finite element analysis was conducted instead. The results from the finite element analysis demonstrate that when the glass was pre-stressed in this manner, the center of glass deflection was 0.993" at 45 psf transverse pressure. Without any transverse pressure, the glass was planar when the perimeter supports were forced planar. In other words, the surface of the pre-stressed glass looks like a conventionally built IGU that is not pre-stressed.

As a final point of comparison, a reference model was constructed of a conventionally built IGU with 3/8" fully tempered inboard and outboard lites that were not pre-stressed (see FIG. 9C). In this reference IGU, the deflection and strength performance of the glass were assessed. The reference model of a conventionally built IGU at a given transverse pressure of 45 psf was analyzed both with the approach given in ASTM E1300 as well as a finite element model. The center of glass deflection of 1.52" from ASTM E1300 agrees closely with the center of glass deflection of 1.552" from the finite element model.

Comparing the finite element model results of the glass used on the high-rise building (FIG. 9A) to the pre-stressed glass (FIG. 9B) indicates that by pre-stressing the glass as described herein, 33% thinner glass (3/8"+3/8" versus 5/16"+5/16"+½") exhibits 12% less deflection (0.993" versus 1.13") at a given transverse pressure of 45 psf. A comparison of the pre-stressed glass (FIG. 9B) to the reference IGU that is not pre-stressed (FIG. 9C) shows the pre-stressed glass exhibits 34% reduction in center of glass deflection at a transverse wind pressure of 45 psf (0.993" versus 1.52"). This is just one example of numerous possibilities with varying degrees of effectiveness to stiffen a material.

Figure 10:
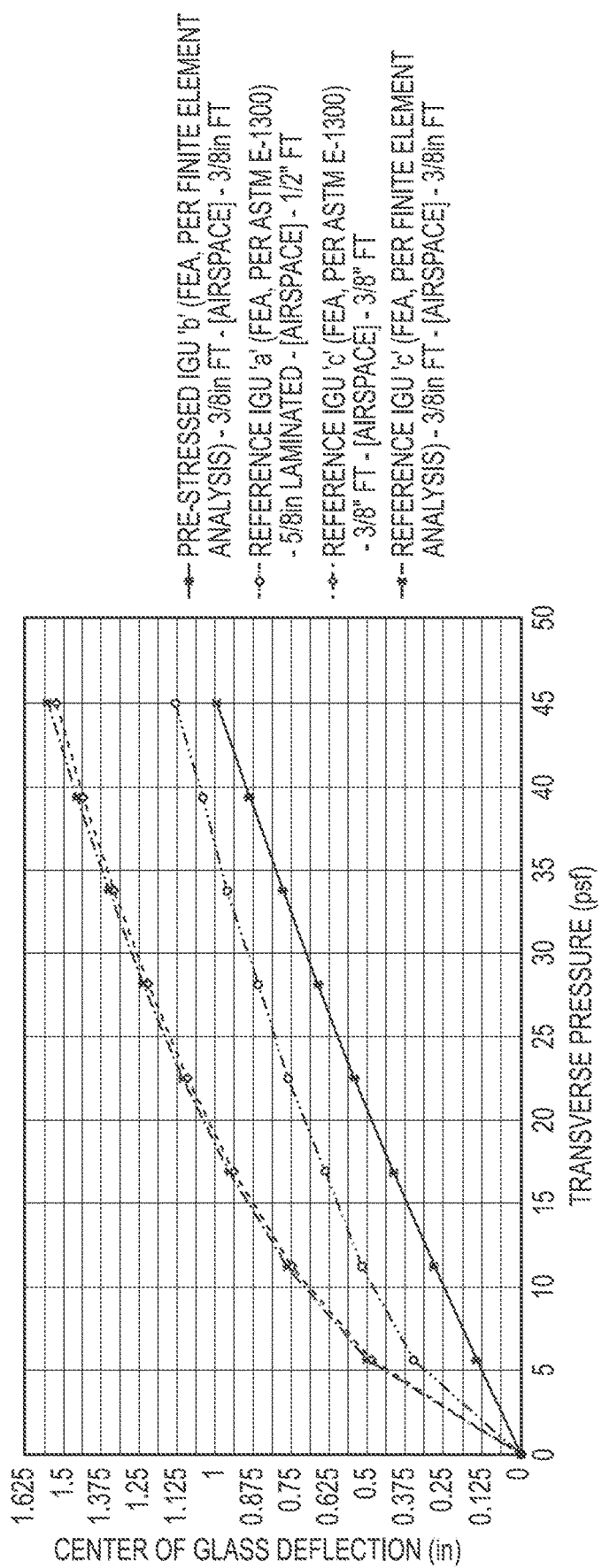
FIG. 10 illustrates a graph of center of glass deflections of different glass types in accordance with an embodiment of the invention.

A plot of center of glass deflection for a series of transverse wind pressures of the three glass layups described above is provided in FIG. 10. Referring to FIG. 10, it is apparent that the glass used in the high-rise building (FIG. 9A) has a higher center of glass deflection than the pre-stressed glass shown in FIG. 9B has at 45 psf. The reference glass shown in FIG. 9C remarkably demonstrates a higher center of glass deflection at just 20 psf than the pre-stressed glass of FIG. 9B exhibits at 45 psf. This indicates a drastic improvement in stiffness in the pre-stressed glass (FIG. 9B) compared to the high-rise building glass (FIG. 9A) and the reference glass (FIG. 9C). Likewise, at pressures in the 5 psf to 10 psf range, the conventional glazing deflects out of plane two to three times that of the pre-stressed glazing, as seen in FIG. 10. The line in FIG. 10 designated "IGU 'a' (FEA, per ASTM E-1300)" corresponds to the structure of FIG. 9A; the line in FIG. 10 designated "Pre-Stressed IGU 'b' (FEA, per Finite Element Analysis)" corresponds to the structure of FIG. 9B; and the lines in FIG. 10 designated "IGU 'c' (FEA, per ASTM E-1300)" and "IGU 'c' (FEA, per Finite Element Analysis)" corresponds to the structure of FIG. 9C. The two IGU 'c' data sets show the agreement between the FEA approach and the industry approach in the U.S. using ASTM E1300.

Figure 11:
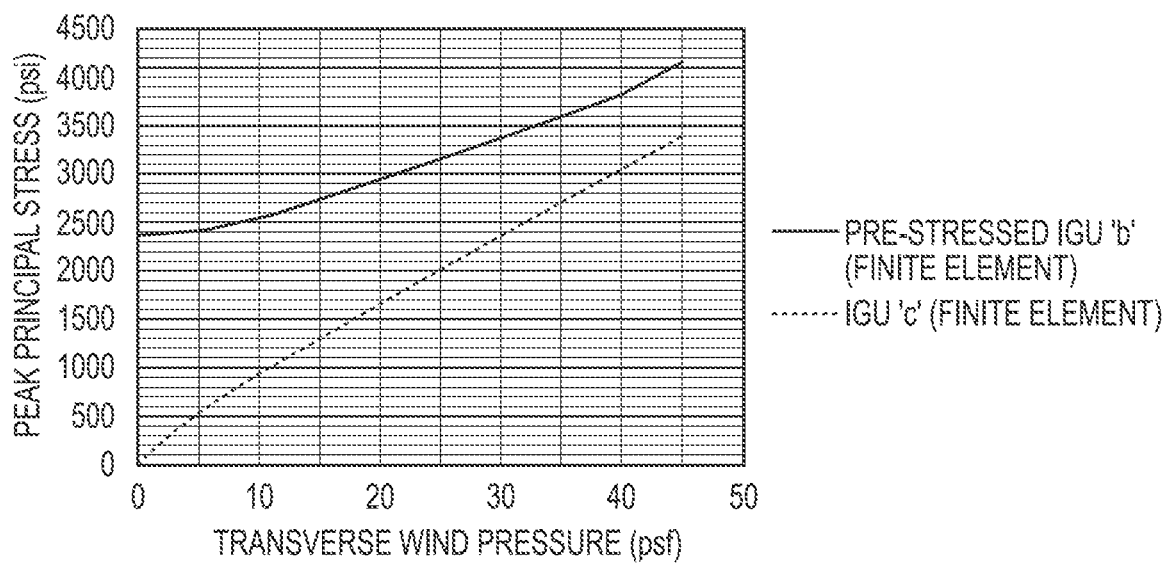
FIG. 11 illustrates a graph of peak principal stresses of different glass types in accordance with an embodiment of the invention.

One tradeoff to achieve this increase in stiffness is a marginal increase in stress, which translates to a lower capacity to resist load. However, stiffness rather than strength typically is the controlling factor of tempered glass in architectural applications, as tempered glass capacity often far exceeds what is required per code. FIG. 11 compares peak principal stress in the pre-stressed glass of FIG. 9B to the reference glass of FIG. 9C. FIG. 11 was generated from finite element models for only these two glazing types, because the two ASTM E1300 models do not output stresses. FIG. 11 shows that some stress increase occurs in the pre-stressed glass of FIG. 9B compared to the reference glass of FIG. 9C, but the difference between peak stresses in the pre-stressed glass and the reference glass decreases with increasing transverse load.

Figure 12:
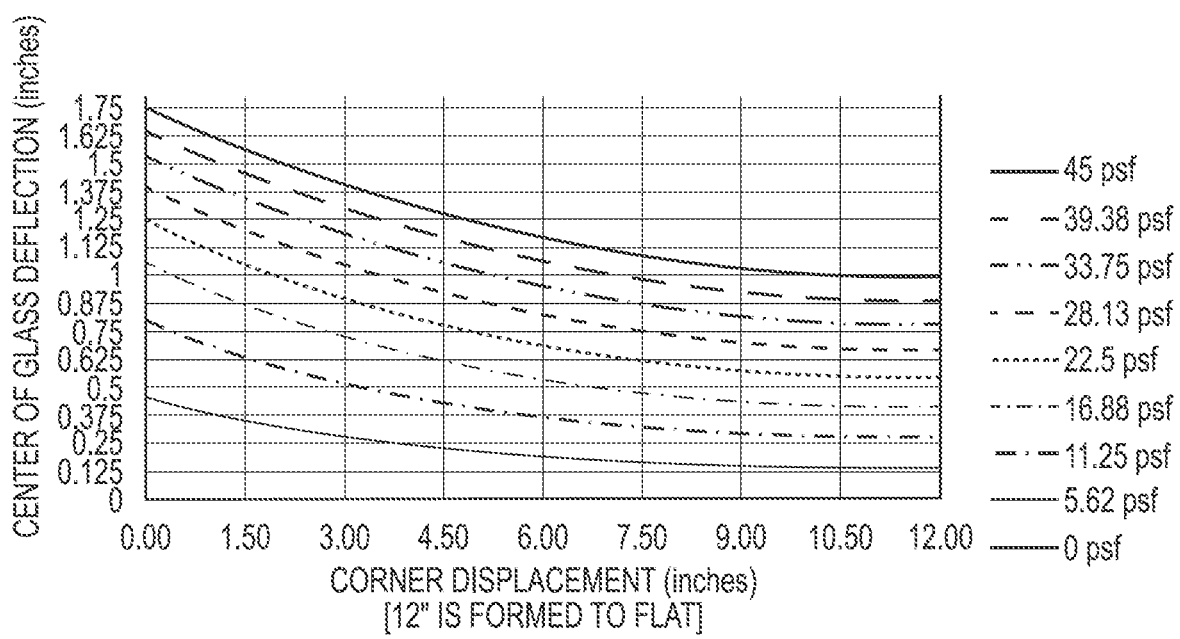
FIG. 12 illustrates a graph of stiffness of hyperbolic paraboloid glass in accordance with an embodiment of the invention.

FIG. 12 shows the results from the finite element analysis of the pre-stressed glass of FIG. 9B at incremental steps in the process of forcing it to a flat shape. Each increment was loaded and unloaded in steps from 0 psf to 45 psf and then back to 0 psf. FIG. 12 shows that the pre-stressed glass provides a significant stiffening benefit, even if its final configuration is non-planar (e.g., refer to the center of glass deflection for any corner displacement less than 12" in FIG. 12).

Referring generally to FIGS. 1-11, the pre-stressed panel approach to increase stiffness to transverse loads provides many competitive advantages. For example, the pre-stressed panel provides increased stiffness for resisting transverse load, reduced thickness (reduces cost of raw materials and frame dimensions), and reduced weight (creates advantages for seismic, shipping, and handling reasons). The pre-stressed panels may provide symmetry on IGU (can still ship flat materials in these types of construction). The pre-stressed panel may enable acoustic alterations or improvements. The pre-stressed panel may enable modification of natural frequency or resonance of the panel. The pre-stressed panel may provide control of buckling tendencies.

The pre-stressed panel approach may provide advantages for building construction, such as curtainwall units. For example, the pre-stressed panel may be advantageous for commercial glazing, where glass as a material is often selected due to its transparency. The desire for transparency makes stiffeners other than perimeter framing an undesirable solution. When deflection governs the design of glass for building facades, the solutions typically available to the designer are to: (1) make the material thicker, (2) reduce the short dimension (width) of the glass, or (3) reduce the long dimension of the glass (although the third option is less effective). As previously discussed, stiffness, not strength, is often the controlling factor in commercial glazing, as tempered glass capacity often far exceeds what is required per code. The highest wind pressures on a project typically are limited to a relatively small percentage of the building envelope (10-30%), and by pre-tensioning a panel as described herein, a global reduction in glass thickness may be realized for a project. The thinner, pre-stressed glass may make economic sense on a full project, as long as the savings for the reduction in the thickness of the glass translates to sufficient savings to cover any upcharge for the pre-stressed glass, since pre-stressing a glass panel as described herein may increase the cost of the glass panel. The thinner, pre-stressed glass may accommodate certain retrofits, which need thinner glass to fit within existing frame envelopes for a historic restoration, for example. The thinner, pre-stressed glass may facilitate operation of operable glass due to its reduced weight. The thinner, pre-stressed glass may improve shipping and handling, because of the significant reduction in the weight of the glass. Overhead applications with sensitivity to dead load deflection may also benefit from this approach.

The pre-stressed panel approach described herein has broad application. For example, the pre-stressed panel approach may be extended to materials which are non-rectangular (circles, triangles, trapezoids, etc.) or non-planar in geometry, but rely on membrane loading to achieve at least some amount of their stiffness to transverse load. Shapes with Gaussian curvature (+/−) may be stiffened with this approach. This approach may allow mitigation of snap through buckling of curved glass (including cylindrically curved elements). The pre-stressed panel approach may apply to various industries, including automotive (e.g., truck body), buildings and bridges (e.g., decks and wall elements), signs and displays, aquariums, naval architecture, HVAC ductwork, and other industries in which a tensioning approach for membrane structures may be useful.

Although the present invention has been described with reference to preferred embodiments, persons skilled in the art will recognize that changes may be made in form and detail without departing from the spirit and scope of the invention.

The invention claimed is:

1. A method of forming a pre-stressed structure, the method comprising:
obtaining a panel in a first shape;
elastically deforming the panel into a second shape;
wherein the second shape of the panel comprises regions of membrane compression and regions of membrane tension,
wherein the regions of membrane tension transition into the regions of membrane compression between a peak of membrane tension and at least one peak of membrane compression,
wherein the peak of membrane tension is located at a center of the panel,
attaching a support structure to the panel only along a perimeter of the panel; and
maintaining the panel in the second shape by the support structure such that the membrane compression is carried within the panel rather than being carried by the support structure.

2. The method of claim 1, wherein the first shape is non-planar.

3. The method of claim 1, wherein the second shape is flatter than the first shape.

4. The method of claim 1, wherein the panel comprises a plate or a shell.

5. The method of claim 1, wherein the first shape comprises a helicoid or a hyperbolic paraboloid.

6. The method of claim 1, wherein the first shape includes a saddle point.

7. The method of claim 1, wherein the second shape is planar.

8. The method of claim 1, wherein the regions of membrane tension form a gradient pattern within the panel.

9. The method of claim 1, wherein the regions of membrane compression form at least one gradient pattern within the panel.

10. The method of claim 9, wherein the at least one gradient pattern comprises a compression gradient along each edge of the panel.

11. The method of claim 10, wherein the at least one peak of membrane compression is located near a mid-length of each edge along a perimeter of the panel.

12. The method of claim 1, wherein the panel is comprised of glass, metal, concrete, wood, or plastic.

13. The method of claim 1, further comprising attaching a second panel to the panel.

14. The method of claim 13, wherein the panel and the second panel are maintained in a state of equilibrium.

15. The method of claim 1, wherein the panel constitutes a component of a curtainwall structure.

16. The method of claim 1, wherein the panel is rectangular, square, circular, triangular, or trapezoidal.

* * * * *